Patented Feb. 19, 1929.

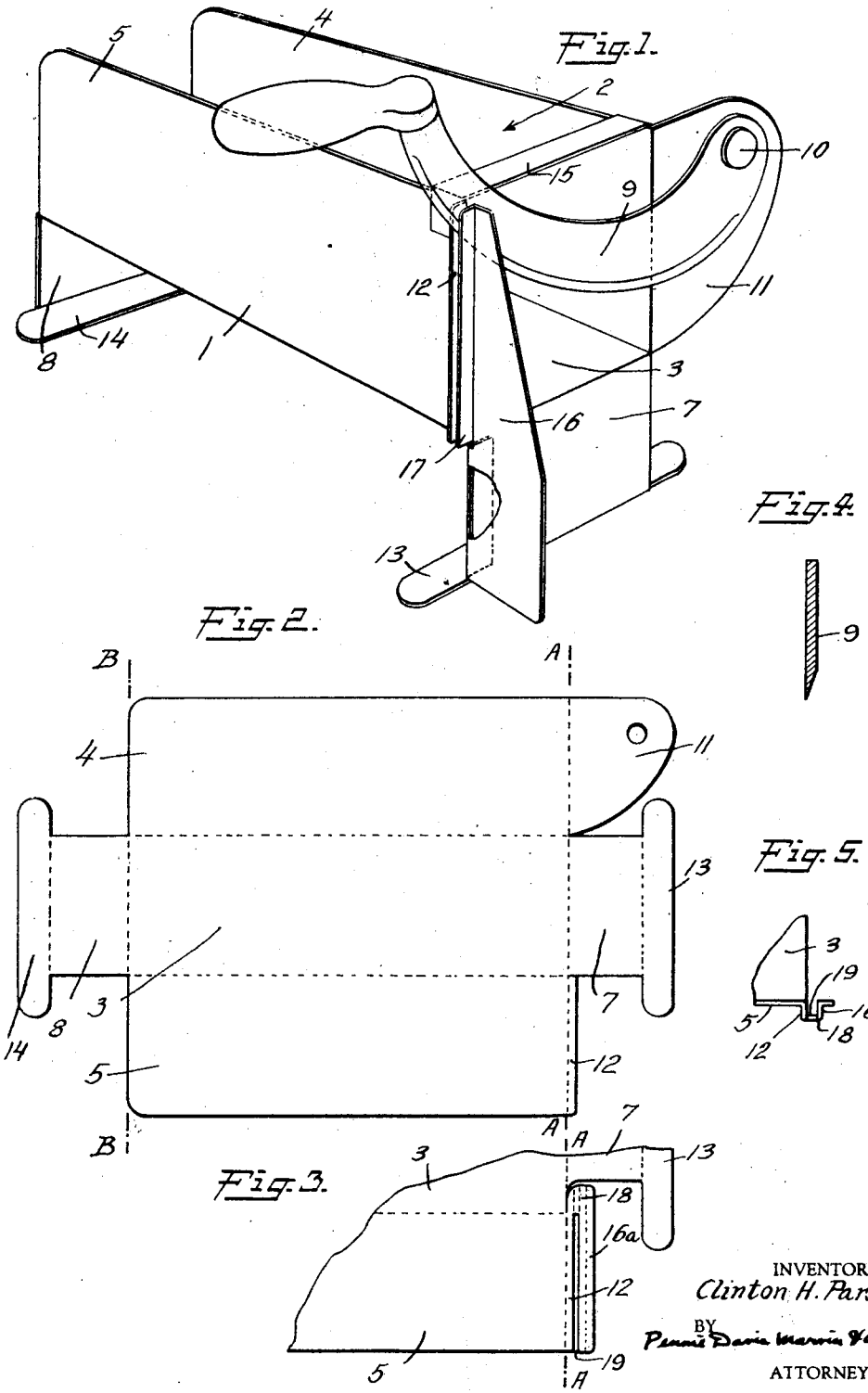

1,702,879

UNITED STATES PATENT OFFICE.

CLINTON HENRY PARSONS, OF CHICAGO, ILLINOIS, ASSIGNOR TO SWIFT & COMPANY, OF CHICAGO, ILLINOIS, A CORPORATION OF ILLINOIS.

CHEESE-SLICING MACHINE.

Application filed March 15, 1928. Serial No. 261,783.

This invention relates to a machine adapted to cut uniform slices from a loaf of cheese or similar material, and includes the cheese slicing machine itself, and a method of making it.

The demand for machines adapted to slice cheese and similar materials has led to the development of a number of such devices which are designed for use with circular cheeses. However, in recent years loaf cheeses have become increasingly popular and have largely displaced the old circular form. These loaf cheeses are made in rectangular blocks having a cross-section about the size of an ordinary slice of bread and are particularly adapted for use in making sandwiches and consequently, merchants who retail the cheese meet with frequent requests that it be cut into thin slices. However, the common types of cheese-slicing machines adapted for use with circular cheese are obviously unsuited for use with the loaf cheese so that the merchants have been obliged to fall back on the old-fashioned knife or else to invest in expensive mechanical slicers.

It is an object of the present invention to provide a simple, light, portable and inexpensive device for cutting slices of any desired thickness from loaf cheeses, and particularly such a device which is adapted to the needs of grocers, restaurant keepers, etc.

The slicing machine of the present invention includes a suitable holding and guiding member, to which is pivotally attached a slicing knife. The holding member is preferably made in the form of a trough into which the loaf of cheese fits snugly and whereby it is held firmly during the slicing. This holder may be constructed of any suitable material, such as sheet steel, iron or other metal, Monel metal, aluminum, wood, etc. It is ordinarily more satisfactory however, to use a sheet metal, both because it may be inexpensively and efficiently fabricated and because lightness and compactness are more easily attained thereby.

The invention is illustrated in the accompanying drawing, and will be further described in connection therewith. In the drawings:

Fig. 1 shows in perspective a completed slicing machine constructed in accordance with my invention;

Fig. 2 indicates how the holding and guiding member may be cut from a single rectangular sheet of material;

Fig. 3 is similar to Fig. 2 but shows a modified form of knife guide;

Fig. 4 is a sectional view of the cutting knife;

Fig. 5 is an edge view of the modified knife guide of Fig. 3 when completed.

The holding and guiding member, indicated by the character 1 on Fig. 1, is composed of a rectangular trough 2, having a horizontal bottom 3 and vertical sides 4 and 5. Legs 7 and 8 are secured to the trough 2 and made integral therewith. These legs should be made of a length sufficient to permit a knife 9, to pass downwardly across the end of the bottom 3, the edge of which is preferably ground square so as to cooperate with the knife to shear off the last thin edge of the slice.

The knife 9 may be secured to the trough in any suitable manner and is preferably attached by a pivot 10 to a flange 11 at the right of the machine, that is, so that the trough may be held by the left hand while the knife is operated with the right hand. The pivot should be placed at a height near the top of the trough and at a distance from its side; and it is best to shape the knife so that its cutting edge will be approximately aligned with the edge of the bottom 3 when approaching the end of a downward stroke. By virtue of this arrangement the knife is drawn longitudinally through the cheese during the vertical cutting stroke so as to give a "sawing" effect which gives a smooth cut and less danger of tearing. The knife blade is shown scimitar shaped in the drawings and that form has been found to possess considerable practical advantage. However, it will be understood that a blade of other shape could be used.

As an additional precaution against tearing or otherwise injuring the slice when it is cut from the loaf, the knife blade is ground with a substantially vertical side adjacent the holder as shown in Fig. 4 and a beveled edge only on its outer side. The straight inner side insures a clean vertical cut and permits the knife to cooperate with the squared edge of the bottom 3 to give a shearing action at the end of the stroke. The bevel on the outer side throws the slice free of the knife as it is cut and prevents its sticking thereto.

The slicing machine of the present invention is designed to be constructed with a minimum both of labor and materials, so that it can be supplied to the trade at a very low price. In the method which I prefer for making this machine, a piece of sheet metal is cut, as indicated by Fig. 2 or Fig. 3 of the drawings. The portions 7, 8, 11 and 12 are bent downwardly at right angles along the lines A—A and B—B and the strips 13 and 14 may also be bent at right angles to the portions 7 and 8 respectively to form horizontal feet. The sides 4 and 5 are then bent upwardly at right angles from the bottom 3 bringing the flanges 11 and 12 into position as diverging vertical guide members. The trough, legs, feet and flanges will then be in the position as shown in Fig. 1. The knife 9 is attached to the flange 11 by means of a rivet or bolt 10. Reinforcing strips such as the strip 15 may, if desired, be secured in place; and an additional guide member 16 having a flange 17 may be secured to the leg 7 so that this flange 17 forms with the flange 12 a slot in which the knife will operate. When this additional guide member is used it may be easily secured to the leg 7, which is long enough to furnish an ample attaching surface; or if desired the guide member 16 may also be cut from the original sheet of material. In the latter case the leg 7 is cut away as indicated on Fig. 3, in order to provide an integral portion 18 depending from the flange 12. The guide 16ª is separated from the flange 12 by a slot 19 which extends only the depth of the side 5. It is secured to the flange 12 by means of the depending portion 18. The blank shown in Fig. 3 is bent as previously described so that the flange 12 is at right angles to the side 5 and the guide 16ª is then bent back parallel to the guide 12 and spaced therefrom the width of the slot 19. In case the sheet metal used is not of itself strong enough to make the guide member 16ª rigid, the edge of this member may be bent at right angles to form a reinforcement as shown in Fig. 5.

It is desirable that the trough portion be made to fit closely to a standard cheese loaf in order that the sides 4 and 5 may hold the loaf firmly and support its edges against any pull of the knife on the surface of the cheese.

The machine as above described can be so simply constructed as to be well within the means of any merchant or housekeeper. Being made of sheet metal and to the size of the cheese loaf, it adds little either in size or weight to the cheese, which is simply placed in the trough and kept there so long as any of the loaf remains. The machine with the cheese in it is convenient to handle and may be put into an icebox where it will occupy little if any more space than would the cheese alone.

When using the machine the knife is raised so as to completely clear the end of the trough, and the cheese is pushed by hand as far as the thickness of the slice desired may require, the knife is then brought down so as to cut off the slice, and the operation is repeated for each slice. Since the cheese is well above the table, or other surface upon which the device may stand, a large number of slices may be cut from the cheese and allowed to fall onto the table without interfering with the operation of the slicer.

I claim:

1. In a device for slicing cheese or similar materials, a holding and guiding means formed from a single rectangular sheet of material comprising an open ended trough, supporting legs, and knife guiding members diverging from one end of the trough in a plane at right angles thereto.

2. A device for slicing cheese or similar materials which comprises a one-piece trough of bendable sheet material, integral supporting and elevating legs bent downwardly therefrom, integral guides at one end bent outwardly from the sides of the trough and a cutting member pivotally secured to one of said guides.

3. A device for slicing cheese or similar materials which comprises a one-piece trough of bendable sheet material, integral supporting and elevating legs bent downwardly therefrom, the lower portion of said legs being bent substantially at right angles to the main portion of the legs to provide a relatively large bearing foot, integral guides at one end bent outwardly from the sides of the trough and a cutting member pivotally secured to one of said guides.

4. A device for slicing cheese or similar materials which comprises a one-piece trough of bendable sheet material, integral supporting and elevating legs bent downwardly therefrom, the lower portion of said legs being bent substantially at right angles to the main portion of the legs to provide relatively large bearing feet, said feet extending laterally beyond each side of the trough whereby the stability of the trough laterally is increased, integral guides at one end bent outwardly from the sides of the trough and a cutting member pivotally secured to one of said guides.

In testimony whereof I affix my signature.

CLINTON HENRY PARSONS.